Patented Oct. 15, 1940

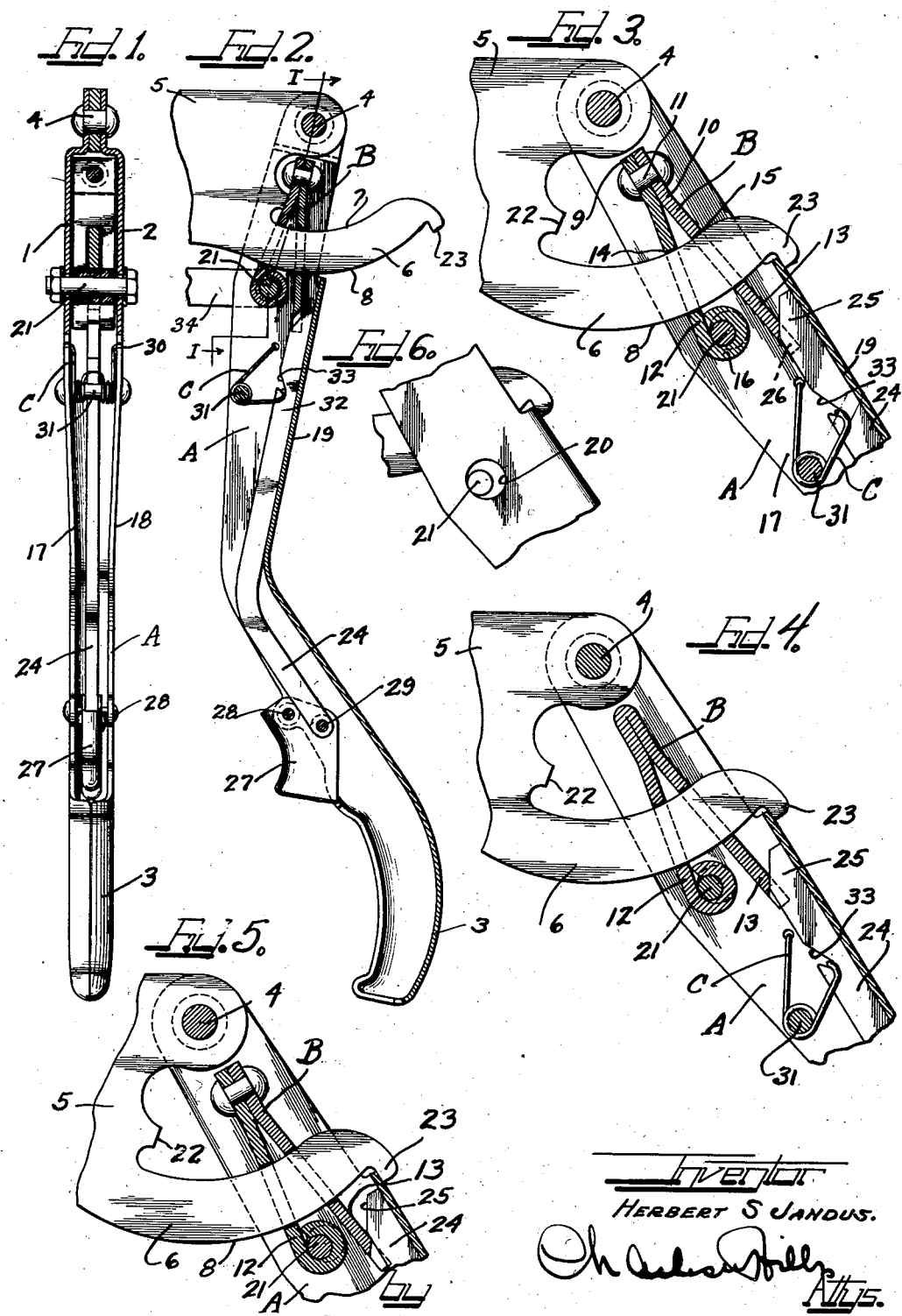

2,217,752

UNITED STATES PATENT OFFICE 2,217,752

BRAKE LEVER—FRICTION TYPE

Herbert S. Jandus, Detroit, Mich., assignor, by mesne assignments, to Houdaille-Hershey Corporation, Detroit, Mich., a corporation of Michigan Application July 2, 1938, Serial No. 217,206
Renewed June 12, 1939

13 Claims. (Cl. 74—531)

The present invention relates to brake lever construction and particularly to a novel control means for frictionally locking the brake lever in adjusted position.

An object of the present invention is to provide novel control means for the emergency brake of an automotive vehicle for frictionally holding the same in adjusted position.

A further object of the present invention is to provide novel brake lever construction wherein maximum braking effect is insured and accidental release of the brake lever when set is substantially eliminated.

Another object of the present invention is to provide a tiltable link normally biased to frictional holding engagement with a fixed cooperating member, as means for locking or latching a brake lever in adjusted position, together with release means operable by endwise movement in a direction of the length of a lever for disengaging the link from holding relation with a fixed member.

The invention has for a further object the provision of of a friction type brake lever construction in which an apertured tiltable link arranged with an aperture for receiving a fixed member is utilized as the locking member, the link being normally biased to holding engagement with said fixed member.

Generally speaking, the present invention contemplates the use of a friction locking member in the nature of a stamped link apertured to receive a fixed member such as a bar, sector or the like, with which the aperture margins make biting engagement when the link is tilted. The link is at all times spring-tensioned to tilted holding engagement with the bar. The invention is herein illustrated and described with a friction locking element of substantially V-shape in side elevation with the legs slotted or notched and arranged over a sector bar with the legs tensioned to make biting engagement with the edges of the bar. One of the legs constitutes the locking link and the other leg serves as the means for applying spring tension to the locking link. The resistance member is shown in the present instance as connected to one of the legs of the locking member which is the locking link engaging the bar to prevent retrograde movement of the lever to the brake pull.

The above, other and further objects of the present invention will be apparent from the following description, and accompanying drawing.

Embodiments of the present invention are illustrated in the accompanying drawing and the views thereof are as follows:

Figure 1 is an edge elevational view of a brake lever constructed in accordance with the principles of the present invention and showing a portion thereof in section.

Figure 2 is a side view of the lever 1, partially in section and partially in elevation showing the relationship of the parts with the lever in "off" position, and the locking member in biting engagement with the sector bar.

Figure 3 is an enlarged fragmental view of the lever of Figure 2 showing the lever in "set" position with the locking member in frictional holding engagement with the sector, and showing the position of the parts when trigger has been moved to initiate release of the lever.

Figure 4 is a view similar to Figure 3 showing the locking member as constructed of one-piece material.

Figure 5 is a view similar to Figure 3 showing the release wedge operated to disconnect the locking member from holding engagement with the bar to enable return of the lever to its "off" position.

Figure 6 is a fragmental side elevational view of a portion of the lever member, adjacent the bar, illustrating the pin and slot connection between the connection of the resistance member and locking bar and the lever member.

The drawing will now be explained.

A lever member A, preferably constituted by a single sheet metal stamping formed to the desired shape and having spaced legs 1 and 2 at one end and a closed grip portion 3 at the other end, is pivoted by means of a suitable pivot pin or rivet 4 to a fixed bracket 5 with the legs astraddle the bracket. Formed as an integral part of the bracket 5 is a sector bar 6 having its top and bottom edges 7 and 8 respectively struck on arcs whose center is the center of the pivot 4. The bracket 5 is secured in any suitable manner to the vehicle, and in the arrangement shown, the lever is mounted behind the instrument board as it is illustrated for actuation as a lever of the dash and cowl type, although it is not limited to such mounting.

A locking member, designated generally as B, is formed of spring metal of substantially wishbone or V-shape in elevation. The locking member B illustrated in Figures 1, 2, 3 and 5 comprises two parts 9 and 10 which are riveted together at 11 and with their legs diverging from the rivet. The legs 12 and 13 are apertured at 14 and 15 respectively to receive the sector bar 6.

In forming the locking member to V-shape, the opening between the legs is made slightly greater than the opening appears when the locking member is applied to the sector bar to thereby cause the legs to spread and normally maintain holding engagement with the top and bottom edges of the sector bar. To apply the locking member to the sector bar, the legs would be compressed slightly to readily be passed over and onto the bar.

The normal expansion of the legs of the locking member tightly grips the sector, that is to say, the locking link is normally biased to holding engagement with the sector or bar.

The free end of the leg 12 is illustrated as provided with a ring or eye 16. The similar end of the other leg 13 extends downwardly below the lower edge 8 of the sector bar 6.

The lever member A as illustrated is formed with a cross section of substantially U-shape providing side walls 17 and 18 and a web 19. In the lever illustrated, the free end of the leg 13 of the locking member B extends downwardly toward the web 19 of the lever member.

The side walls of the lever member are apertured at 20 to receive a pin 21 which passes through the eye 16 in the end of the leg 12 of the locking member. The apertures 20 are greater than the diameter of the pin 21 to provide a lost motion connection between the lever member and the pin so that when in "off" position, the lever member may be out of contact with the pin.

To limit the swing of the lever member A in "off" direction, the bracket 5 is provided with an abutment 22 which contacts the locking member B, as shown in Fig. 2. To limit the extent of swing of the lever member in the opposite direction, the end of the sector bar 6 is provided with a hook or other stop 23 for engagement by the web 19 of the lever member when swung in brake applying direction, as may be observed in Fig. 3.

The construction of the locking member B is such that in any position to which it is shifted, along the sector bar 6, the inherent tendency of the legs to spread moves the legs into biting engagement with the edges of the sector bar.

Release mechanism, for releasing the locking member B from holding engagement with the sector bar is illustrated as comprising a member 24 arranged with a portion of the same bearing against the inner surface of the web 19 of the lever member and having a wedge shaped end 25 normally disposed adjacent the free end of the leg 13 of the locking member.

Preferably the free end of the leg 13 is slotted as at 26 to straddle the wedge shaped end 25 of the release member 24.

A trigger 27 is shown as pivoted at 28 to the lever member, above the grip portion 3 in position to be operated by the forefinger of the vehicle operator and on the pull side of the grip portion. The trigger 27 is formed as a stamping working in the slot defined by the side walls of the lever member immediately above the grip portion of the lever member. The trigger 27 is pivoted at 29 to the release member for moving it endwise as the trigger is rocked.

In order to normally maintain the release member 24 in normal position and to maintain the trigger 27 swung outwardly, spring means are provided.

The spring means herein illustrated comprises a looped spring structure C having its ends bent outwardly and engaged through openings 30 in the side walls of the lever member, an intermediate body portion is wound about a pin 31 which extends through the side walls of the lever member, while a looped portion 32 is engaged in a notch 33 of the release member 24. The spring C functions to hold the release member in the position shown in the drawing in Figures 1, 2, 3 and 4.

Figure 5 illustrates a release member 24 as it appears when shifted against the leg 13 of the locking member B in a direction to release holding engagement of the locking member with the sector bar 6.

Attached to the ends of the pin 21 are links 34 which in turn are suitably connected to the brake mechanism of the vehicle by means of a cable or rod and may constitute the legs of a clevis.

The normal position of the parts with the lever in "off" position is that shown in Figure 2.

To move the lever in a direction to apply the brakes, the operator grasps the grip portion 3 of the lever member and swings it in counterclockwise direction, as viewed in the drawing.

Swinging movement of the lever member will cause the adjacent margin of the apertures 20 in the side walls of the lever to contact the pin 21 and move it in counterclockwise direction, that is, pulling it to the right, as viewed in the drawing. Such movement will set the brakes and will also shift the leg 12 of the locking member B out of biting engagement with the sector bar 6 thus enabling movement of the lever in brake setting direction.

When the lever has been moved sufficiently to set the brakes, the operator releases his hold of the grip portion 3, whereupon the tendency of the connected brake mechanism to move the lever in retrograde direction, that is, in clockwise direction as viewed in the drawing, will oppose pull on the eye 16 of the leg 12 of the locking member and thus force it into biting engagement with the top and bottom edges of the sector bar, thus securely holding the lever in its then adjusted position.

When it is desired to release the brake lever, the operator grasps the grip portion of the lever and with his forefinger about the trigger 27, swings the trigger in counterclockwise direction about its pivot 28 which causes endwise shift of the release member 24, i. e. upwardly as viewed in the drawing. This movement of the member 24 shifts the lever member A to the right, taking up all of the clearance between the pin 21 and the margin of the hole 20, as shown in dotted lines in Figure 3 and in full lines in Figure 6. The operator then gives the grip 3 a slight pull simultaneously with pressure on the trigger 27 thus moving the member 24 upwardly against the rear of leg 13 of the locking member B, as shown in Fig. 5. The grip is then pushed to the left thereby causing the full leverage of the lever member A to release holding engagement of the locking member.

It will be observed that the locking member is not connected to the lever member but floats with respect to the lever member.

The invention has been described herein more or less precisely as to details, yet it is to be understood that the invention is not to be limited thereby as changes may be made in the arrangement and preparation of parts, and equivalents may be substituted, without departing from the spirit and scope of the invention.

The invention is claimed as follows:

1. The combination with a resistance member of an arcuate bar, a lever pivoted to swing astraddle said bar, a locking member having slotted legs engageable with edges of said bar and which legs are compressed when applied to said bar to thereby cause said legs to normally grip said bar with holding action effective in both directions of lever movement, a resistance member connected to one leg of said locking member, and release means movable along said lever member into engagement with the other leg of said locking member to disengage the holding engagement of said locking member with said bar to permit movement of said lever in retrograde direction.

2. In a device of the class described including a mounting plate, an arcuate bar formed as an integral portion of said plate, a lever pivoted to said plate to swing along said bar, a locking member V-shaped in side elevation having its legs slotted for receiving the bar and adapted for frictionally engaging opposite edges of said bar, a resistance member connected to one leg of said locking member to tilt it into gripping engagement with said bar responsive to brake pull, and shiftable means on said lever engageable with the other leg of said locking member for rocking the latter about its connection to the resistance member for freeing the locking member from engagement with the bar when said shiftable means is shifted in one direction.

3. The combination with a resistance member of an arcuate bar, a mounting plate formed as an integral portion of said bar, a bifurcated lever pivotally mounted on said plate at the center of curvature at said bar, a locking member having divergent spring legs slotted for receiving the bar and adapted for frictionally engaging opposite edges of said bar, said legs being strained when said member is applied to said bar to cause both legs to normally grip the opposite edges of the bar with holding action, said resistance member being pivotally connected to one of said legs, and means shiftable on said lever member engageable with the other leg of said locking member to disengage the holding engagement of said locking member with said bar.

4. In a device of the class described, a mounting plate having an integral bar in the form of a circular arc, a lever pivoted to said plate at the center of curvature of said arc, a locking member having spaced legs slotted for receiving said bar and tensioned to normally frictionally engage opposite edges of the bar, said member being disconnected from said lever, a resistance member connected to one end of said locking member to urge it into gripping engagement with said bar, a release member shiftable on said lever engageable with said locking member to release the grip thereof with said bar when said release member is shifted in one direction, and spring means acting on said release member to normally maintain it shifted in the opposite direction to thereby allow the locking member freedom for gripping action with said bar.

5. In combination with a resistance member of a mounting plate having an arcuate bar as an integral part, a bifurcated lever pivotally mounted on said plate at the center of curvature of said bar, a locking member comprising two separate parts secured together at one end and with the other ends spaced forming legs with slots in said legs for engaging said bar, one leg of said locking member being pivotally connected to said resistance member, and means on said lever for engaging the end of the other leg for unlocking said locking member from said bar to permit movement of the lever in retrograde direction.

6. The combination with a resistance member of a mounting plate having an integral arcuate bar of the shape of a circular arc, a bifurcated lever pivotally connected to said plate at the center of curvature of said bar, a locking member comprising a single piece bent into V-shape in side elevation forming spread legs notched to engage opposite edges of said bar and movably mounted on said bar, said resistance member being pivotally connected to one end of one of said legs, and means shiftable on said lever for engaging the end of the other leg to release the holding engagement of said locking member with said bar to enable movement of the lever in retrograde direction.

7. In combination, a mounting plate having a projecting portion in the form of an arcuate bar, a locking member comprising divergently spaced legs which are slotted to slidingly move along said bar, a lever member pivoted to said plate adapted to straddle said bar and locking member, a pin passing through one end of one leg of said locking member and through enlarged openings in said lever member, a resistance member connected to said pin and tending to urge it in one direction, a member shiftable along said lever member for engaging an end of the other leg of said locking member to thereby shift the lever member with respect to said pin to effect contact of the margin of said openings with said pin to thereby position the lever member for release of the brakes, release then being effected by push action applied against the grip portion of the lever member.

8. In combination, a bar secured in fixed position, a locking member having spread spring legs which are slotted for engaging said bar with frictional holding engagement, a resistance member pivotally connected to one end of one of said legs, a lever member having a part embracing said locking member and straddling said bar, the pivotal connection of said resistance member to said leg projecting through enlarged apertures in said lever member, said locking member being movable along said bar in opposition to the pull of the resistance member by contact of the aperture margin with said pivotal connection as said lever member is moved in one direction, and said lever member having a part engageable with the other leg to release said locking member for lever movement in opposite direction.

9. In combination, a bar secured in fixed position, a locking member having spread spring legs which are slotted and inherently tensioned for normally engaging said bar with frictional holding engagement, a resistance member pivotally connected to one end of one of said legs, a lever member having a part embracing said locking member and straddling said bar, said lever member having a part for exerting pressure against the said one end of said one of said legs to enable sliding movement of said locking member along said bar in one direction and having another part for exerting pressure against the end of the other leg to enable sliding movement of said locking member in reverse direction.

10. Emergency brake lever construction for automotive vehicles comprising in combination, a lever member movable to set and release the brakes, means for supporting said lever member in operative position, said means including a part adapted to cooperate with a tiltable locking member, a tiltable locking member movable with said lever member and apertured to encompass said supporting means part with the aperture edges adapted to make biting engagement with said part and normally biased to frictional holding engagement with said part to retain said lever member in adjusted position, a release member endwise movable against said locking member to free it from holding engagement, a trigger operable adjacent the lever member grip portion for moving said release member against said locking member to unlock the same, and means for normally maintaining the adjacent end of said release member spaced from said locking member.

11. Brake operating mechanism including in combination, an operating lever connected to the brake mechanism, means for supporting said lever in operative position, said supporting means including a part adapted to be frictionally engaged by a locking link to hold the lever in adjusted position, a locking link movable with said lever and being apertured to receive the said supporting means part, said link adapted to be moved freely along said supporting means part in one direction and to bias of its own accord for biting engagement therewith to resist movement in the opposite direction, a release member disconnected from said locking link and movable endwise in one direction for disengaging the holding relation of said link and said supporting means part, trigger means operable adjacent the lever grip for so moving said release member, and spring means normally maintaining said release member out of contact with said link and resisting movement thereof in said one direction.

12. Brake operating mechanism including in combination, an operating lever connected to the brake mechanism, means for supporting one end of said lever in operative position, said supporting means including a part adapted to cooperate with a frictional locking member, a double-legged frictional locking member movable with said operating lever and movably mounted on said supporting means part, said locking member adapted to be moved freely along said supporting means part in one direction and of its own accord to frictionally engage therewith with holding action to resist movement in the opposite direction, a movable release member carried by said operating lever for engagingly releasing the frictional holding engagement of said locking member and supporting means part when moved in one direction, said release member having a portion adjacent the free end of said operating lever for moving it in said one direction, and resilient means restraining said release member from movement in said one direction.

13. In combination with a resistance member, a lever connected to said member and having a handle at one end, means mounting said lever in operative position, said mounting means including a fixed bar, a locking member movable with said lever and apertured to receive said bar, said locking member having a resilient portion normally biasing it into frictional engagement with said bar, said locking member adapted to be moved freely along said fixed bar in one direction and to bias of its own accord into frictional holding engagement with said bar to resist movement of said lever in the opposite direction, an endwise movable release member carried by said lever for disengaging the holding engagement of said locking member and bar when the release member is moved in one direction, said release member having a part adjacent the lever handle for moving it in said one direction, and spring means for normally resisting movement of said release member in said one direction, said locking member being biased into holding engagement with said fixed bar independently of any action of said last-mentioned spring means, and without causing movement of said release member.

HERBERT S. JANDUS.